April 13, 1937.  F. X. MILLER  2,077,000
STRAW SAVING ATTACHMENT
Filed Feb. 27, 1936
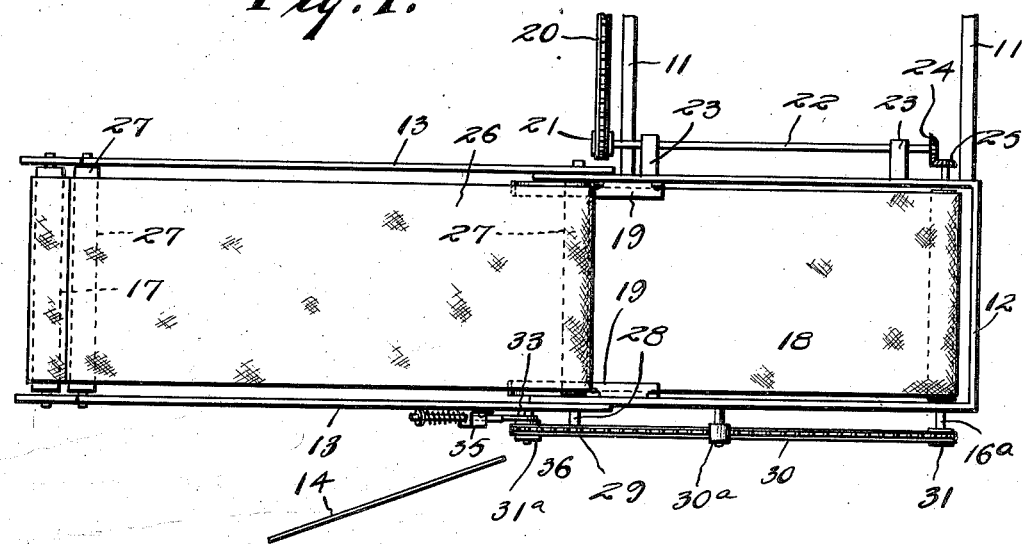
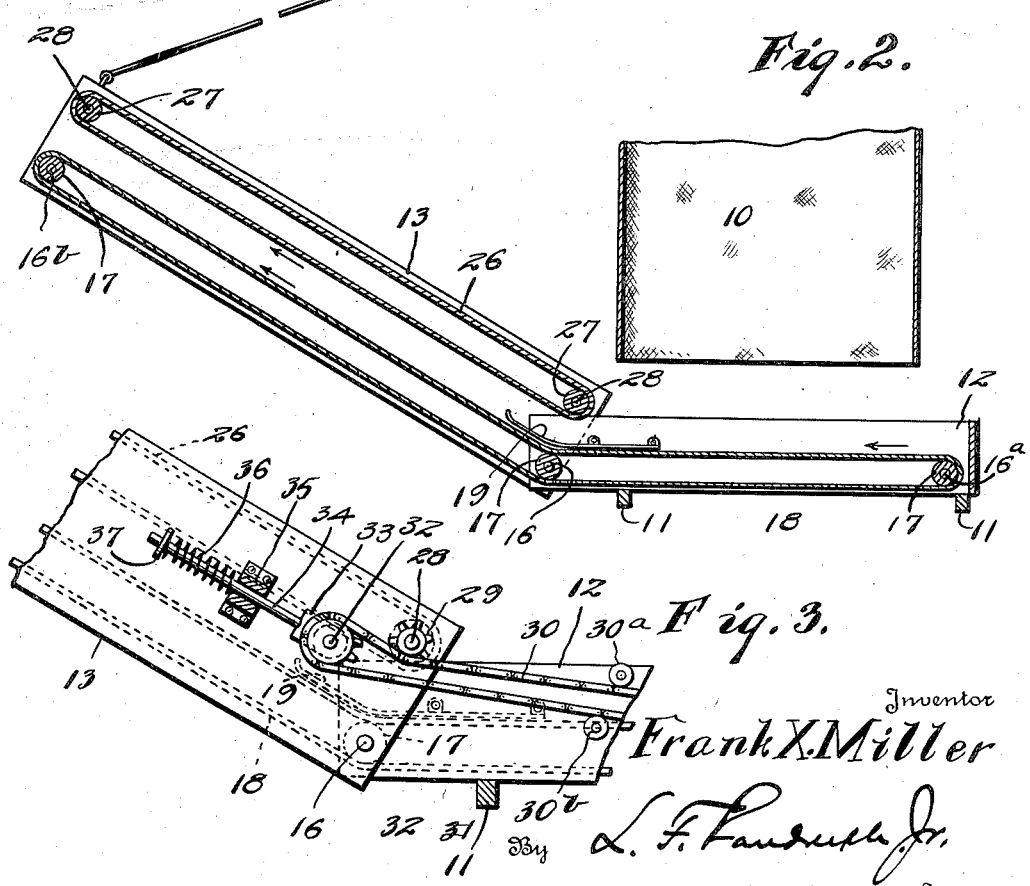

Patented Apr. 13, 1937

2,077,000

UNITED STATES PATENT OFFICE 2,077,000

STRAW SAVING ATTACHMENT

Frank X. Miller, Macksville, Kans.

Application February 27, 1936, Serial No. 66,091

1 Claim. (Cl. 198—165)

This invention relates to a straw saving attachment for thrashing machines or combination harvesters and thrashers.

Machines of the harvesting or harvesting and thrashing type at the present time have a scattering device for the straw, whereby the same is returned or scattered over the ground. The present invention provides a means whereby the straw may be saved or used for other purposes, and by a mechanism which is adapted to be substituted for and operate in place of the scatterer.

The more specific objects and advantages will become apparent from a consideration of the description following taken in connection with accompanying drawing illustrating an operative embodiment.

In said drawing:

Figure 1 is a view in plan of my attachment;

Figure 2 is a vertical sectional view through the attachment; and

Figure 3 is a fragmentary side elevation of the attachment.

Referring specifically to the drawing wherein like reference characters designate like or similar parts, 10 designates the straw discharge hood of a harvester-thrasher which straw is usually scattered by mechanism supported on bars or the like 11, forming part of said combination harvester-thrasher. In the practice of my invention, the scatterer is removed and the operative parts of my invention supported on the bars or supporting element 11, and rigidly fastened thereto in any suitable manner.

According to the invention, a frame 12, generally of U-shape, is removably bolted, clamped or otherwise secured to the said supporting bars 11, from the open end of which frame 12 elevator side members 13 angularly rise, being pivotally connected to the frame 12 as hereinafter explained, and at the upper end, being suspended in its different adjusted positions as by one or more adjustable cables, guy wires or the like 14, connected to the side members 13 and to a suitable part of the harvester-thrasher.

The frame means 12—13 have the trunnions, axles or shafts 16, 16a and 16b of three rollers 17, journalled therein. Shaft 16 pivotally connects elevator side members 13 to frame 12. Over such rollers 17, an endless belt or conveyor 18 is trained, held in operative position by a guide plate or the like 19 located over the roller 16 and fastened at 16' to frame 12.

A scatterer usually supported on the element 11, (discarded to accommodate my invention) is driven by a sprocket chain 20 and a sprocket wheel 21 over which it is trained. The present attachment is also operated or driven from the sprocket wheel 21. To this end, a shaft 22 is rigidly and removably attached to the sprocket wheel 21, such shaft being journalled in bearings 23 on one side of the frame 12.

Shaft 22 through the medium of intermeshing bevel gears 24 and 25, respectively on shaft 22 and shaft 16a, drives one of the rollers 17 and hence imparts motion to the endless belt 18.

A short endless elevating conveyor 26 is arranged over and in parallelism to the inclined or elevating run of the conveyor 18, being trained over rollers 27, having axles, shafts or trunnions 28 journalled in the side members 13. On the lowermost shaft 28, a sprocket wheel 29 is fastened and thereover a sprocket chain 30 is trained which is driven by a sprocket wheel 31 fastened on the shaft 16a. Chain 30 is maintained tensioned by means of a sprocket wheel 31a journalled at 32 on a slide block 33 having a rod 34 slidably mounted in a bracket 35 fastened to one side member 13. An expansive spring 36 surrounding rod 34 engages an abutment 37 on that rod urging sprocket 31a away from sprocket 31. Conventional slide chain tighteners 30a and 30b may be fastened on one side of frame 12.

With the device installed, and the harvester-thrasher operating over the field, the straw instead of being scattered as it is discharged through the hood 10, will fall on to the horizontal run of the belt 18, move to the left therewith and be grasped between the inclined run of the belt 18 and the belt 16, which delivers or discharges it at the left hand end of the side members 13, such straw falling or being loaded into a barge, rack mounted on trucks, into a wagon or otherwise, as for hauling into a barn or to be stacked in the field for future use as seed.

Various changes may be resorted to provided they fall within the spirit and scope of the invention.

I claim as my invention:—

A device of the class described comprising a frame, rollers mounted by said frame, a straw receiving and discharge belt traversing said rollers, a driving means for one of the rollers, means operating to drive one of said rollers from said first mentioned driving means, inclined side members rising from said frame and pivoted thereto by means of one of said rollers, a roller mounted by said side member over which said conveyor is trained, a conveyor coacting with the first mentioned conveyor, rollers on the side members over which the latter conveyor travels, chain and sprocket means to drive one of the latter rollers from one of the first mentioned rollers, an element slidably mounted on one of the inclined side members, a sprocket wheel carried by said element over which said sprocket chain is trained, and spring means urging the sliding movement of said element to tighten the chain.

FRANK X. MILLER.